Dec. 5, 1967 O. G. VILLARD, JR 3,357,018

MODE-AVERAGING DIVERSITY COMBINING RECEPTION SYSTEM FOR HIGH-FREQUENCY RADIO WAVES

Filed Nov. 6, 1964 4 Sheets-Sheet 1

INVENTOR
OSWALD G. VILLARD, JR.

BY [signature]

ATTORNEY

INVENTOR
OSWALD G. VILLARD, JR.
BY Harvey G. Lambert
ATTORNEY

INVENTOR
OSWALD G. VILLARD, JR.
BY Harvey G. Lowhurst
ATTORNEY

Dec. 5, 1967 O. G. VILLARD, JR 3,357,018

MODE-AVERAGING DIVERSITY COMBINING RECEPTION SYSTEM FOR HIGH-FREQUENCY RADIO WAVES

Filed Nov. 6, 1964 4 Sheets-Sheet 4

INVENTOR
OSWALD G. VILLARD, JR.
BY Harvey G. Lambert
ATTORNEY

United States Patent Office 3,357,018

Patented Dec. 5, 1967

3,357,018
MODE-AVERAGING DIVERSITY COMBINING RECEPTION SYSTEM FOR HIGH-FREQUENCY RADIO WAVES

Oswald G. Villard, Jr., Woodside, Calif., assignor, by mesne assignments, to Itek Corporation, Lexington, Mass., a corporation Delaware Filed Nov. 6, 1964, Ser. No. 409,502
17 Claims. (Cl. 343—100)

This invention relates to a high-frequency reception system for radio waves and more particularly to a reception system which eliminates, or at least minimizes substantially, frequency-selective fading in both single and double-sideband high-frequency radio transmission.

Selective fading, as the term is used herein in connection with high-frequency radio wave reception, refers principally to the phenomenon caused by interference between different modes, such as for example the single-hop and the double-hop transmission path between a transmitting and receiving station which are due to a single and a double ionospheric reflection of the transmitted energy. As is well known, the different path lengths of the single and double-hop results in a difference in time delay at the point of reception, and, if arriving at the reception station equal in amplitude and 180 electrical degrees out of phase, add vectorially to cause complete destructive interference between the two received beams at some given modulating frequency of the carrier.

Selective fading also includes interference between the signal which has been reflected from the ionosphere (sky wave) and the signal which travels along the ground (ground wave) which can combine to cause nulls. However, when the distance between the transmitter and the receiver is appreciable, the ground wave usually is sufficiently attenuated so that selective fading due to interference between the sky wave and the ground wave is not a serious problem.

Selective fading has the effect of producing one or more nulls in the received passband which drift through the passband with time due to the constant changes in the height and density of the ionosphere. These nulls will have a width in the frequency spectrum on the order of a few hundred cycles, and a depth which depends on the number present and their relative amplitudes. The depth of the null would be a maximum when two signal components (such as the one-hop and two-hop modes), are of equal amplitude and 180 degrees out-of-phase. If such a deep null drifts through the carrier frequency of a double-sideband amplitude-modulation transmission, severe distortion is caused because the sidebands—which are for the most part unaffected—will "overmodulate" the weakened carrier. The null will then cause the complete obliteration of the transmitted intelligence.

Another way to view selective fading is to consider the effects of the phenomenon which causes different frequencies to travel along somewhat different paths in the ionosphere so that the time to reach the receiver is different for the different sideband frequencies. Thus, one particular intelligence frequency of a selected primary path (say the one-hop mode) may reach the receiver to add to that frequency of the other selective path (say the two-hop mode), while another intelligence frequency may cancel.

The customary means for avoiding selective fading is to provide a second antenna, connected to a second receiver, which is spaced some distance from the first antenna. Due to the physical separation of the antennas, it will be found that the position of the nulls in the signal spectrum received by each receiver due to interference between the one-hop and the two-hop mode will be different. A means is then provided for the receiver sensing the strongest carrier component at any given instant to take control so that the audio output is supplied entirely by that receiver.

This procedure is effective against "overmodulation" distortion owing to carrier loss, but it is not effective in eliminating the nulls in the received audio response-versus-modulating-frequency characteristic. The receiver which takes control is the one receiving the stronger carrier component, but nothing in this diversity-combining process will eliminate the null or nulls which may exist elsewhere in the frequency band of the receiver which has taken control.

Frequency distortion is not eliminated by the simple addition of two independently received and independently fading sets of sidebands. Even though a "hole" in one sideband spectrum will appear to be filled by a maximum in the other, "holes" at other positions in the combined spectrum will then be generated owing to the presence of equal amplitude and oppositely phased signal components. Double sideband amplitude modulation may be regarded as dual frequency-diversity, single-sideband plus carrier transmission, with linear addition of the audio voltages derived from each set of side frequencies. It is well known that no fading advantage results from this procedure.

It is therefore an object of this invention to provide an improved method for eliminating, or at least substantially reducing, selective fading in receiver systems.

It is another object of this invention to provide a receiving system which averages the various modes received by the receiver system over a time period which is shorter than the highest frequency of the intelligence on the transmission carrier.

It is another object of this invention to provide a method for averaging the various signals received by a receiver system utilizing either their amplitude, or their polarization, or both.

It is a further object of this invention to provide a means and a method for eliminating frequency distortion in high-frequency receiver systems caused by selective fading by averaging the various received modes utilizing polar pattern sweeping.

It is a still further object of this invention to provide a means and a method for eliminating frequency distortion in high-frequency receiver systems caused by selective fading by averaging the various received modes utilizing polarization sweeping.

It is also an object of this invention to provide improved means and an improved method to eliminate selective fading, which, without rejecting or selecting one mode over another, combines all received modes and utilizes the average value of the sum of the received modes. More particularly, the means and method of this invention varies one or more characteristic of the incoming modes, in opposite manner, in a time period which is shorter than the period of the highest intelligence frequency, and combines the result of such mode variations to arrive at a running average value of the incoming modes.

Briefly, in one embodiment of the present invention the receiver system is constructed, and includes means, for continually altering the effective relative amplitude of the received modes, that is, the single-hop and the double-hop modes. More particularly, an effective polar receiving pattern is created by utilization of a pair of spaced antennas and is swept continually so that the directional receiving sensitivity of the two beams changes continually with respect to one another at a frequency not less than the frequency of the intelligence modulated upon the carrier.

In this manner, the two received modes are of equal amplitude only for a very short period of the sweep time and should the two beams have an interfering relationship, that is, be out-of-phase and of equal amplitude at the receiver station, the scanning pattern changes their relative amplitudes and thereby averages the signals so that the tone is not lost. Another way of looking at this system is to say that the receiver null, due to selective fading, is no longer perfect but is filled in by averaging over a sweep cycle.

In another embodiment of this invention, a polarization sensitive antenna is provided and the plane of polarization is continually swept through 360 degrees in a period of time which is shorter than the highest intelligence frequency transmitted. In this manner, an average is derived, which, as before, fills in the nulls and thereby eliminates selective fading.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIG. 1 is a schematic block diagram of a mode-averaging receiver system constructed in accordance with this invention and utilizing a phase shifter to provide a sweeping polar pattern;

FIGS. 2A, 2B, 2C, 3A, 3B, 3C, 4A, 4B, 4C, 5A, 5B, and 5C are illustrative antenna patterns and phasor diagrams useful in explaining the theory and operation of this invention;

Figure 1:
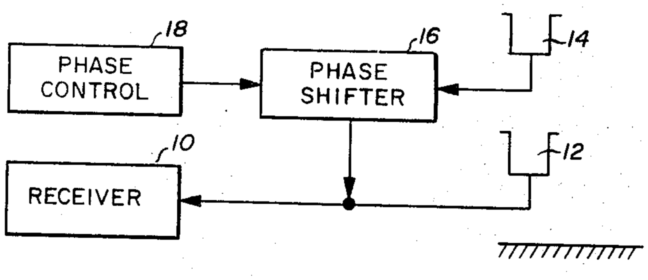

Referring now to the drawings and particularly to FIG. 1 thereof, there is shown in purely schematic manner one embodiment of the mode-averaging diversity combining receiver system of the present invention. The receiver system there shown comprises a receiver 10 having connected thereto a first antenna 12 for receiving amplitude-modulated high-frequency radio waves. Receiver 10 may be of the well known superheterodyne type since this type of receiver is practically universally used to receive radio signals.

There is further provided a second antenna 14 which may be similar in all respects to antenna 12 and which is connected to receiver 10 through a controllable phase shifter 16. The phase shift provided by phase shifter 16 is controllable by a suitable phase control means 18 connected thereto. As will become better understood hereinafter, control means 18 is constructed and operated to cycle phase shifter 16 to induce a phase shift of the waves passing therethrough which varies continually and cyclically from zero to 360 degrees.

Phase shifter 16 may be of the mechanical type in which case phase control means 18 may take the form of an electric motor whose output shaft is mechanically coupled to phase shifter 16. It is to be understood however that phase shifter 16 may also be of the electronic type, variable by the application of a control signal in which case phase control means 18 may be a suitable signal source generating a control signal adapted to cyclically and continuously vary the phase shift of phase shifter 16 from zero to 360 degrees.

Antennas 12 and 14 are either spaced vertically or horizontally, with respect to one another and are preferably oriented with their reception pattern or lobes lying in the plane of the great circle connecting the antennas and the distant transmitter. If antenna 12 and 14 are spaced horizontally, then they must lie in a common great circle plane joining them and the distant transmitter.

Antennas 12 and 14, connected to single receiver 10, are the equivalent of an antenna array and produce an antenna pattern whose shape and directivity depends on their spacing and radiation characteristics. As is well known, a change in the electrical length of the path between one antenna and the receiver, while keeping the path length between the other antenna and the receiver constant, has the effect of changing the directional characteristic of the antenna pattern. Controllable phase shifter 16 is the equivalent of a controllable electrical path length.

The operation of the mode averaging diversity combining receiver system of FIG. 1 will now be explained with the assistance of the antenna patterns and phasor diagrams of FIGS. 2 to 5. When phase shifter 16 is operated to continuously and cyclically vary the phase of the energy passing therethrough, the effect of this phase variation, as seen at receiver 10, is a continuous and cyclic variation of the antenna polar pattern in a vertical plane. In other wards, the polar antenna pattern is rotated in a vertical plane which coincides with the plane of the great circle connecting the transmitter and receiver system.

Figure 2A:
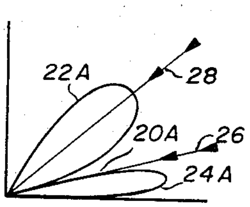
Figure 2B:
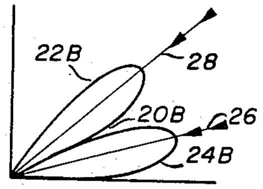
Figure 2C:
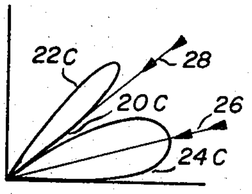

Assume that FIGS. 2A, 2B, and 2C represent the resultant polar pattern of antennas 12 and 14 for three different settings of phase shifter 16 and that lines 26 and 28 represent the vertical angle of incidence of two modes such as the two-hop and one-hop rays respectively. FIG. 2A shows mode 28 intercepted by the center of lobe 22A and mode 26 intercepted by the inner edge of lobe 24A very close to the null 20A between the lobes. FIG. 2B shows modes 28 and 26 respectively intercepted by the center of lobes 22B and 24B which now are of equal size. Lastly, FIG. 2C shows the exact reverse of FIG. 2A, namely the interception of mode 28 by the inner edge of the lobe 22C and the interception of mode 26 by the center of lobe 24C.

It is significant to note for the three phase shifter positions shown in FIGS. 2, first one mode and then the other mode is discriminated against. According to this invention, as the phase shifter is cyclically varied, the polar pattern is rotated in the vertical plane so that each mode will fall into a null of the polar pattern in a time period which is shorter than the period of the highest modulating frequency. Thereafter, the received mode energy is added and applied to the receiver. In this manner, a running average of the two received modes is detected.

Figure 3A:
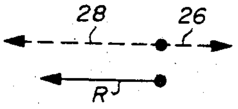
Figure 3B:
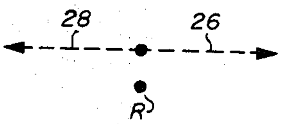
Figure 3C:
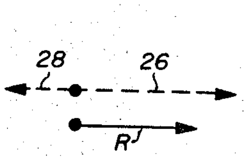

FIGS. 3A, 3B and 3C are phasor diagrams which respectively show the output signals from antenna 12 and 14 for the three settings of phase shifter 16 corresponding to the ones shown in FIGS. 2A, 2B and 2C, for the case where modes 26 and 28 arrive at the receiving system in phase (that is, a particular modulated frequency is in phase). Because the voltages are received by adjacent lobes of the antenna pattern, a 180 degree phase shift is introduced between the voltages due to modes 26 and 28. Accordingly, for the particular modulating frequency selected, the voltages are out-of-phase and for the particular antenna patterns assumed, the voltage due to mode 28 changes from high to low whereas the voltage due to mode 26 changes in the opposite manner. There is also shown the resultant voltage "R" constructed by vectorial addition of the two mode voltages. The voltage "R" is of course the voltage applied to receiver 10 and only the amplitude is of importance in connection with eliminating selective fading. As is seen the resultant voltage "R" changes in amplitude and goes through zero as the mode voltages are equal in amplitude.

Figure 4A:
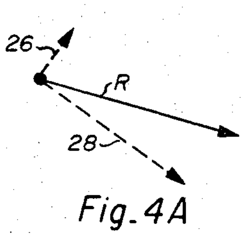
Figure 4B:
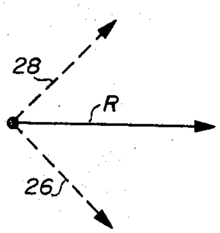
Figure 4C:
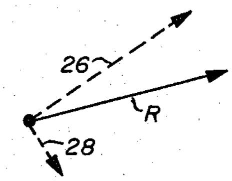

FIGS. 4A, 4B and 4C are phasor diagrams just like those of FIGS. 3A, 3B and 3C and depict the case of arriving modes having a 90 degree phase difference between them at a selected modulating frequency. Under these conditions, the mode voltages are in quadrature and their respective amplitudes charge in the same manner as explained in connection with FIGS. 3A, 3B and 3C. However, the resultant voltage R does not go through zero but instead rotates in phase while the amplitude never becomes smaller than maximum voltage due to a single mode.

Figure 5A:
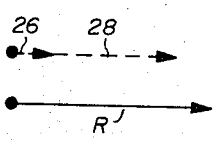
Figure 5B:
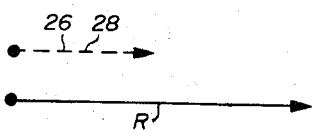
Figure 5C:
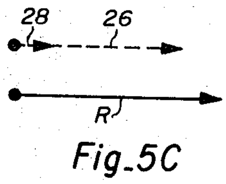

Likewise, FIGS. 5A, 5B and 5C are the phasor diagrams constructed for a pair of modes arriving in out-of-phase condition (for the selected modulated voltage) for the three phase shifter settings shown in FIGS. 2A, 2B and 2C. The amplitude of the individual mode voltages changes as before but they are now in phase so that the resultant has a magnitude equal to their algebraic sum. It is therefore seen that the resultant voltage R is at all times large and in phase with the mode voltages.

Since the variation of the polar pattern, or sweeping of the null shown in FIGS. 2A, 2B and 2C, is accomplished solely by varying the setting of phase shifter 16, the pattern change will repeat one or more times each time the phase shifter 16 is changed by 360 degrees. It is now possible to take a running average of the resultant signal amplitude changes.

To avoid distortion of the modulating intelligence it is essential to sweep the vertical polar pattern null at a rate which is high compared to the highest signal modulating frequency. Of course, it is to be remembered that a phase shift, like the one provided by phase shifter 16, results in a frequency shift. If the sweep rate is very high, the receiver must have a bandwidth sufficiently broad to accept both the original frequency from antenna 12 and the shifted frequency from the output of the phase shifter and antenna 14. The smaller the rate of the pattern null sweep, the less pronounced will be the frequency shift and the narrower may be the bandwidth of the receiver. Accordingly, a compromise has to be made between a high sweep rate for good averaging and a low sweep rate for meeting a given receiver bandwidth requirement. As a practical matter, a sweep rate of the null corresponding to a frequency which is somewhat larger than the highest modulating frequency to be detected has been found admirably suited for practicing this invention since it provides good averaging without making undue demands on the receiver bandwidth so that good discrimnation against other broadcasting stations is maintained.

Figure 6:
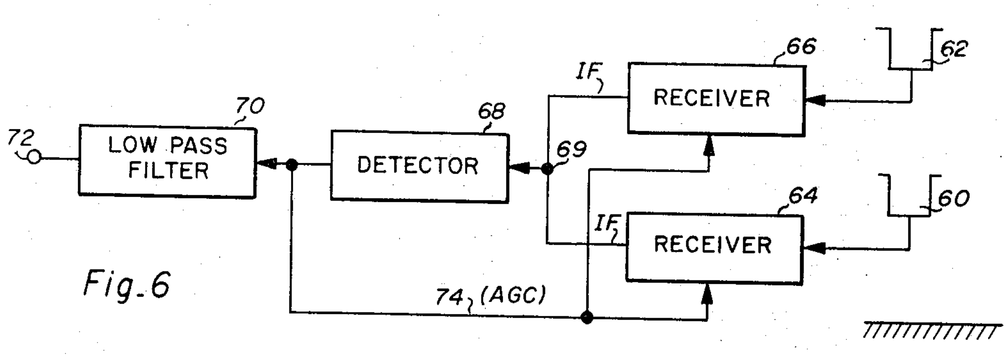
FIG. 6 is a schematic block diagram of an alternate embodiment of a mode-averaging receiver system of this invention utilizing different intermediate frequencies to produce, in effect, a sweeping polar pattern.
Figures 9A, 9B:
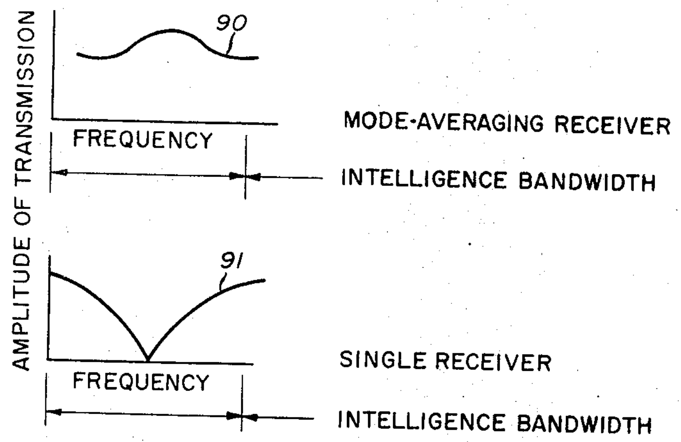

Referring now to FIG. 6, there is shown an alternate and preferable embodiment of the mode-averaging diversity combining reception system of this invention which comprises, in combination, a pair of antennas 60 and 62 spaced apart either vertically or horizontally in the manner explained in connection with the spacing of antennas 12 and 14 of FIG. 9. Antenna 60 is connected to a receiver 64 and antenna 62 is connected to a receiver 66. Receivers 64 and 66 are narrow-band and include all receiver stages up to and including the intermediate frequency amplifiers. For example, the bandwidth of the receivers may be of the order of 6 kilocycles per second.

The intermediate frequencies of receivers 64 and 66 are selected to be different, such as for example, 455 kilocycles per second for receiver 64 and 500 kilocycles per second for receiver 66 so that different local oscillator frequencies must be employed. The intermediate frequency signals from receivers 64 and 66 are applied to a conventional diode detector means 68 through a common input circuit schematically indicated at 69 for detection of the audio signal. The detected output signal from detector 68 is suitably filtered by a low-pass filter 70 which typically has a pass-band from zero to 3000 cycles per second. The detected and filtered audio signal is applied to a receiver system output terminal 72 which may be connected to a suitable utilization device such as a loud speaker or recorder. A portion of the detected signal is also utilized, in the customary manner, to provide automatic gain control which is schematically indicated by a feedback circuit 74. It is to be noted that the automatic gain control is common to both receivers to maintain an equal gain in both receivers.

As will become better understood hereinafter, the exact frequency difference of the centers of the intermediate frequencies is not important so long as the difference is well above the highest audio modulating frequency. In this example a frequency difference of 45 kilocycles per second was selected which meets this requirement. The primary function of low-pass filter 70 is to reject the intermediate frequency difference frequency (or beat frequency) and to pass the desired modulating audio frequency.

The circuit arrangement illustrated in FIG. 6, as viewed at the input terminal of diode detector 68, is equivalent to the receiver system of FIG. 1 in that the utilization of slightly different intermediate frequencies in the two receivers produces an interferometer effect by synthesizing a sweeping of the antenna pattern. For proper mode averaging, the gains of receivers 64 and 66 are preferably kept equal at all times which is accomplished by deriving their automatic gain control signal from a common source, such as the detected signal.

Figures 7A, 7B, 7C:
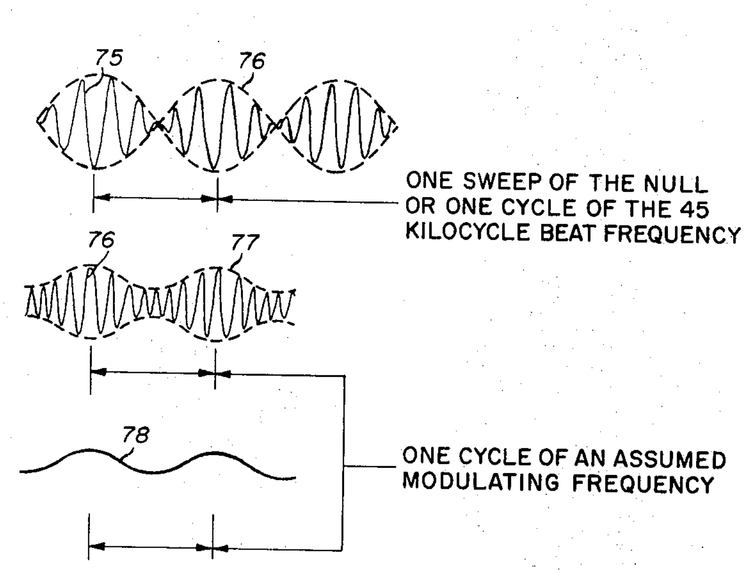
FIGS. 7A, 7B, 7C, 8A, 8B, 8C, 9A and 9B are respectively illustrative diode detector wave forms and transmission versus frequency curves useful in explaining the theory and operation of this invention.

The mode-averaging operation of the receiver system of FIG. 6 can best be understood by reference to the wave forms shown in FIGS. 7 and 8. Assume initially that only a single signal path exists, say only the one-hop or the two hop mode is present. Accordingly, antennas 60 and 62 each receive a steady voltage corresponding to that single mode assuming initially an absence of modulation. Since the antennas have equal response and since the gains of receivers 64 and 66 are equal, the two intermediate frequency voltages applied to detector 68 will be equal in amplitude and will beat together at 45 kilocycles per second rate. This state of affairs is shown by the diode detector wave form pattern of FIG. 7A in which curve 75 depicts the intermediate frequency signal and curve 76 depicts the 45 kilocycle beat frequency.

If the single incoming mode is sinusoidally amplitude-modulated at an audio frequency rate, the intensity of both received signal components will vary in synchronism, and the envelope 77 of the 45 kilocycle beat frequency signal 76 will vary with time as shown in the diode detector wave form of FIG. 7B. Applying the signal depicted in FIG. 7B to detector means 68 will result in a demodulated envelope 78 of this wave as shown in the diode detector wave form of FIG. 7C. The signal shown in FIG. 7C of course is the replica of the modulated audio signal.

Assume next that two incoming modes are present, such as the one-hop and the two-hop modes, and that they are of equal amplitude. This assumption is similar to the assumption made in connection with the antenna pattern depicted in FIG. 2B. Assume further that the receiver system shown in FIG. 6 produces the idealized polar pattern variation illustrated in FIGS. 2A, 2B and 2C and that this variation repeats once every cycle of the 45 kilocycle difference frequency. The resultant intermediate frequency voltage supplied to detector 68 can then be found by constructing phasor diagrams in the manner explained in connection with the phasor diagrams of FIGS. 3, 4, and 5.

Figures 8A, 8B, 8C:
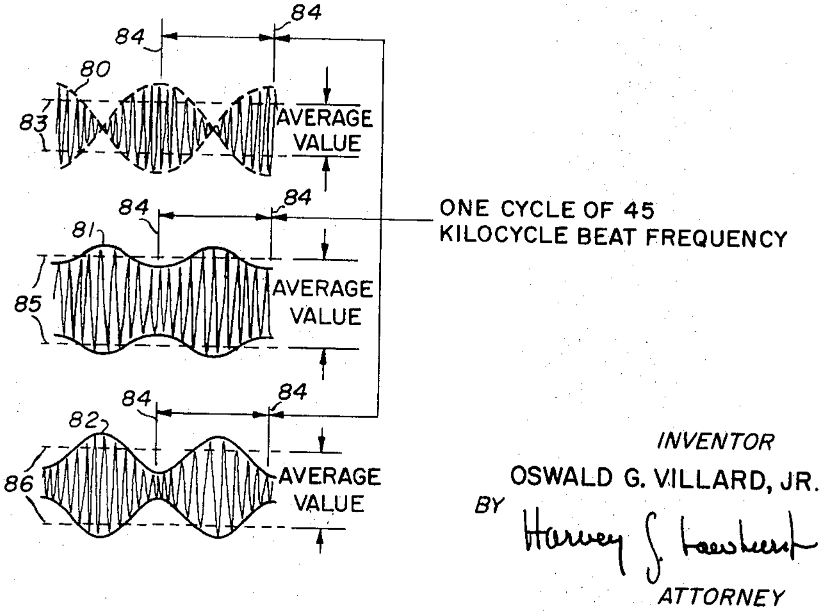

FIGS. 8A, 8B, and 8C show the variation of the amplitude of the resultant derived from such phasor diagrams during one cycle of the 45 kilocycle difference frequency and, more particularly, of the relative phase between the two mode voltages. In FIG. 8A, the two mode voltages are assumed to arrive at the receiver in phase so that a single receiver would find a maximum in the frequency spectrum at the operating frequency. For a phase shifter setting which results in the polar pattern shown in FIG. 2B, the two mode voltages will be received with equal amplitudes. One will be received by one lobe of the antenna and the other by the other lobe. Since the phase of the voltage picked up by one lobe will be reversed with respect to the voltage picked up by the other lobe at that particular instant in the phase shifter or difference frequency cycle, the two mode voltages cancel and the resultant is zero. However, for the polar patterns corresponding to the ones shown in FIG. 2A and 2C, the mode voltage resultant is maximized. Thus, if an average of the resultant voltage is taken over one cycle of the difference frequency (i.e. over one sweep of the null in the antenna polar pattern) a finite output will be obtained. The average value of the output voltage over one cycle of difference frequency is indicated by the lines 83 and one cycle is indicated by lines 84.

FIGS. 8B and 8C show the diode detector input voltage wave forms 81 and 82 for the two mode voltage case when the voltages arriving at the receiver system are respectively in quadrature and out-of-phase. These wave forms are constructed by phasor diagrams similar to those of FIGS. 4 and 5 and represent the resultant of the individual mode voltages. The separation lines 85 show the average for the three relative mode phases for the mode voltages arriving in quadrature and the separation between lines 86 shows the corresponding average value for the mode voltages arriving out-of-phase.

It is most significant to note that the value of the diode detector input voltages 80, 81 and 82 have an average value over one cycle of pattern variations which is substantially the same in all three cases depicted in FIGS. 8A, 8B and 8C. Without running mode averaging as here taught it is immediately apparent that the case depicted in 8C would result—in the single receiver—in selective fading whereas the average value of the mode envelope of FIG. 8C shows substantially very little change in amplitude due to the effect of fading.

The audio voltage appearing at output terminal 72 of the receiver system of FIG. 6 is the running average over the 45 kilocycle difference frequency of the sum of the two intermediate frequency voltages applied to diode detector 68. The variation of this average with relative phase of the individual mode voltages is shown by curve 90 of FIG. 9A. Since the different relative phases correspond to different radio frequencies, curve 90 is also a plot of amplitude of responses versus the radio frequency. For this reason curve 90 may be directly compared with the plot of amplitude of response versus radio frequency of a simple receiver, as shown by curve 91 of FIG. 9B, which is subject to selective fading.

A comparison of curves 90 and 91 immediately discloses that frequency distortion over the intelligence bandwidth is very greatly reduced so that the quality of the output of the mode-averaging receiver is substantially independent of selective fading.

While it has been stated heretofore that the two pick-up antennas should be spaced either vertically or horizontally with respect to one another to provide reception lobes lying in the plane of the great circle connecting the receiver and the transmitter system, it is to be understood that such spacing has been suggested because it is most effective in providing a vertical polar pattern variation. However, it is well known that a pair of antennas placed transverse to the great circle plane and which provides an azimuthal polar pattern, in practice also includes some vertical polar pattern variation and therefore may likewise be employed. In fact, as long as the antennas are spaced apart, they will in most cases provide some polar pattern variation usable in connection with practicing the instant invention.

It is also to be understood that the idealized polar pattern depicted in FIGS. 2A, 2B and 2C will usually not exactly depict the lobes provided by a simple interferometer arrangement as illustrated in FIGS. 1 and 6. However, it shou'd now be obvious that any kind of polar pattern variation in elevation tends to reduce the depth of the nulls in the transmission band between a transmitter and a receiver system. While an optimum arrangement contemplates the sweeping of a very deep null through the entire range of the downcoming modes, any type of change of the polar pattern will result in some mode averaging and therefore in an improvement in diversity reception.

While the receiver system of this invention has been explained in connection with a double sideband transmission system, it is likewise applicable to single sideband transmission systems with the carrier reduced or missing. However, in that case, the reduced or missing carrier must be resupplied or "exalted" within each receiver prior to application of the diversity-combining procedures described above. By this means the single sideband is converted into an effective amplitude modulated signal. "Exaltation" is necessary for proper operation of a diode detector as is well known to those skilled in the art. In the case of reduced-carrier reception, only one set of carrier-selecting and "exalting" circuits is required, if the two receivers are provided with a common high-frequency local oscillator and use intermediate-frequency amplifiers turned to the same frequency. Injection of the locally generated or "exalted" carrier can then occur at this common intermediate frequency. Before diversity combining however, it will be necessary to translate one of the two intermediate frequency signals to a new intermediate frequency in order to satisfy the requirement of synthesizing a polar pattern sweep.

The mode averaging receiver systems of FIGS. 1 and 6 make use of the fact that the various received modes, say the one-hop and two-hop modes, have different vertical angles of arrival so that a vertical pattern sweep may be utilized for averaging. In addition, in general, the various modes will have differing polarization at the pick up antennas, or, stated more correctly, it is very unlikely that the modes would have at any given time the same polarization. The mode averaging principle of the present invention can be likewise adapted to utilizing the effective polarizations of the incoming modes for averaging, by providing a polarization-sensitive antenna and effectively rotating the plane of polarization of this antenna at a rate which is greater than the period of the highest modulating frequency.

The probability that the received modes, at any given radio frequency, will disappear completely during a complete rotation of the plane of polarization of the antenna is practically negligible just as the probability of the disappearance of the combined signal during the sweeping of the null of the vertical antenna pattern is low.

Figure 10:
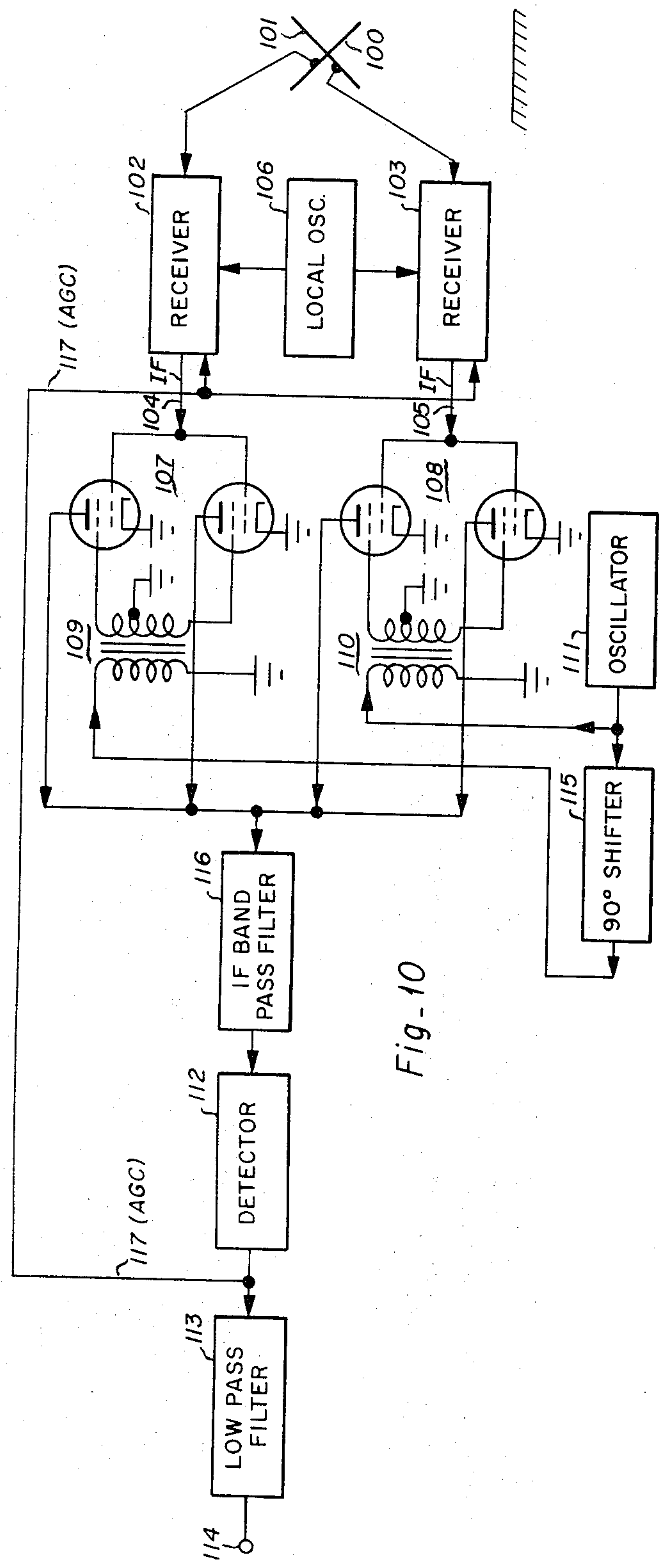
FIG. 10 is a schematic block diagram of a further embodiment of the mode-averaging receiver system of this invention utilizing a modulatory scheme to average modes by sweeping the plane of polarization.

Referring now to FIG. 10, there is shown a mode-averaging diversity combining reception system utilizing a rotating plane of polarization. A pair of crossed dipoles 100 and 101, or their equivalent, are each connected to a different one of a pair of receivers 102 and 103 which provide intermediate frequency output signals on leads 104 and 105. For proper operation of this receiver system it is necesary that the oscillators of receivers 102 and 103 be phase-locked to one another or have a common local oscillator 106 shown. Lead 104 is connected to a first balanced modulator means 107 and lead 105 is connected to a second balanced modulator means 108 which may be identical to means 107.

A modulating signal from an external audio signal oscillator means 111 is applied, in quadrature, to the input transformers 109 and 110 of balanced modulators means 107 and 108. Oscillator 111 is selected to provide a modulating signal which has a frequency higher than the highest modulating frequency for the same reason which applies to the selection of the sweeping of the polar pattern explained in connection with FIG. 6. A suitable modulating frequency would be 40 kilocycles per second. the modulating signal, to provide quadrature modulation, is applied directly to input transformer 110 and applied to input transformer 109 through a 90 degree phase shifter 115.

The modulated intermediate frequency signals are then added to one another and applied to the input terminal of a diode detector 112 in the customary manner through an intermediate frequency band-pass filter 116 which may have a band-pass from 150 to 850 cycles per second. In this manner the relative magnitudes and phases of the receiver output voltages are varied in such a way that there is delivered to detector 112 an intermediate frequency voltage which is equivalent to that of a single receiver having a rotating dipole. After detection the signal is passed throgh a low pass filter 113 to a receiver output terminal 114. The action of filter 113 is the same as that explained in connection with filter 70 of FIG. 6. If desired, an automatic gain control circuit 117 may be connected between the output of detector 112 and receivers 102 and 103.

The operation of the mode-averaging receiver of FIG. 10 can also be explained with the aid of phasor diagrams, analogous to the ones shown in FIGS. 3, 4 and 5. The resultant of the phasors represents relative direction of polarization of the effective antenna pattern. Just as shown in FIG. 3B the output of a single receiver connected to a single antenna would only suffer a signal loss when the direction of polarization, the phase, and the amplitude of the two incoming modes were exactly the same. However, the probability that all these requirements will be satisfied at a given instant is very small so that changes in receiving antenna polarization can be usefully employed for mode averaging.

While the receiver system of FIG. 6 first averages the component signals from the two receivers in all possible phases and thereafter derives the average, a similar result may be accomplished by first adding the component signal of the two receivers in all possible relative amplitudes and thereafter deriving the average of the amplitude. A mode-averaging diversity combining reception system utilizing this alternate scheme is shown in FIG. 11.

Figure 11:
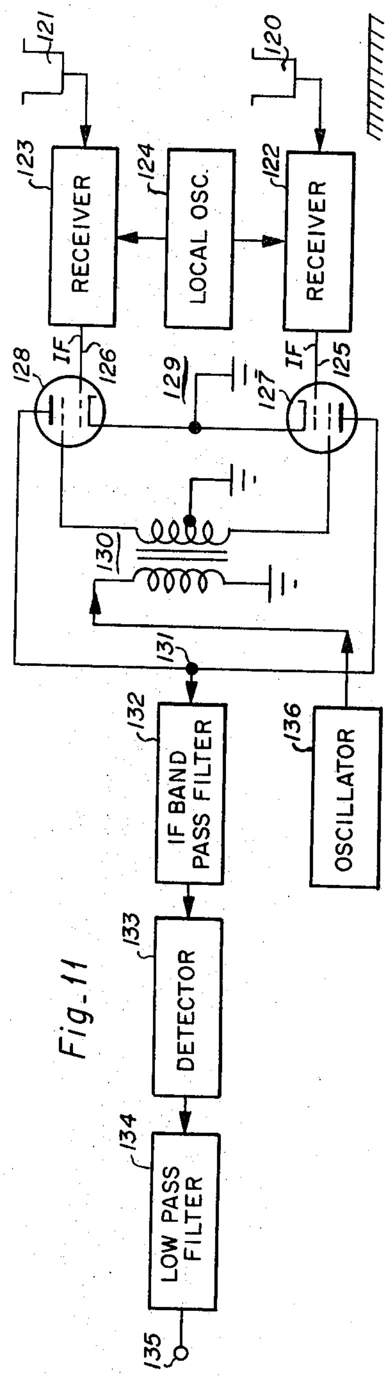
FIG. 11 is a schematic block diagram of still another embodiment of the mode-averaging receiver system of this invention utilizing quadrature modulation to average the received modes.

In FIG. 11, a pair of spaced antennas 120 and 121, are respectively connected to a pair of receivers 122 and 123 which either share a common local oscillator means 124 or are otherwise phased-locked to one another. The intermediate frequency output signal from the two receivers is applied, via leads 125 and 126 respectively, to opposite sides of a balanced modulator means 129 utilizing a pair of tubes 127 and 128 as control or modulating elements. The anodes of tubes 127 and 128 are connected to a common output terminal 131 and the screen grids are connected to opposite ends of the secondary winding of a modulation transformer 130 having a grounded center tap.

The primary winding of modulation transformer 130 is connected to an oscillator 136 which provides a modulating signal having a frequency at least twice the frequency of the highest modulating signal of the incoming transmission. It is to be noted that, in the arrangement shown in FIG. 11, transformer 130 feeds modulator 129 in phase opposition so that the modulating signal from oscillator 136 controls the tube 127 during one-half cycle and tube 128 during the other half cycle.

Tubes 127 and 128 are so biased that, in the absence of the modulating signal from source 136 applied to their screen grids, each tube amplifies with normal gain. When the modulating signal is applied, the amplification of one tube is cyclically reduced to zero while that of the other tube is raised to about double its resting value. This action repeats during each cycle of the applied modulating signal which typically may have a frequency of 30 kilocycles per second.

Output junction 131 is connected, through an intermediate frequency band-pass filter 132, to the input terminal of a diode detector 133 for detecting the signal. The detected signal is then passed, through a low-pass filter having a pass-band from zero to about 3000 cycles per second, to a receiver output terminal 135 for further utilization.

The frequency of the modulating voltage supplied by oscillator 136 is not critical but should not be too high for reasons which will now be explained. The action of tubes 127 and 128 is to smoothly vary the relative contribution of the two receivers to common output terminal 131. There will, accordingly, appear across the primary of the band-pass filter means 132 (a transformer) voltage at the intermediate frequency, say 455 kilocycles per second, which is fluctuating in amplitude at the rate of the modulating signal, say 30 kilocycles per second. The precise shape of the fluctuation of this voltage, over one cycle of the modulating signal, will be a function of the instantaneous phase and amplitude of the output voltages of the two receivers. Detector 133 therefore takes an average over this waveform as before.

As is well known, amplitude modulating the intermediate frequency receiver output signal generates sideband frequencies of the 455 kilocycles per second center frequency, extending out to about 10 times the modulating frequency, or ±300 kilocycles per second. It is for this reason that the band-pass filter 132 between common output terminal 131 and diode detector 133 should have a pass-band extending from approximately 150 to 850 kilocycles per second. In this manner the complex wave shapes of the voltages representing the summation of the outputs of the modulator tubes 127 and 128 are preserved. In addition, the 30 kilocycles per second modulating voltage is prevented from reaching detector 133.

If the modulating frequency is made too high, it is clear that some of these sideband frequencies may extend down into the zero to 3 (or 5) kilocycles per second audio pass-band. This would cause spurious signals to appear in the audio signal. For this reason the modulating frequency should not be made unnecessarily high but should be above and not too far away from twice the highest audio modulating frequency.

In the embodiment of the mode-averaging receiver system of FIG. 11, the modulating voltage supplied by source 136 should be a wave which varies with time and may have the form of a sine wave, or preferably, a triangular wave. If a square wave were to be applied, it would simply key each receiver on for one-half the time and the nulls from the incoming plural modes would still appear in the audio output signal, because the net effect at the output terminal 131 would be equivalent to adding the diode detector audio output from a receiver connected to one single antenna to a similar audio output from a receiver connected to the other antenna. As is well known, there is no mode averaging and audio pass-band null suppression under such circumstances.

Utilizing a sine wave or a triangular wave or for that matter any wave whose amplitude varies smoothly, all possible relative amplitudes of the two receiver outputs are sampled during one cycle of the modulating signal and the net effect tends to cause the nulls which would otherwise appear in the output pass-band to disappear.

The operation of the mode averaging receiver system of FIG. 11 can also be explained with the aid of phasor diagrams analogous to those shown in FIGS. 3, 4 and 5. For example, taking the case represented by FIG. 2B, where the relative phases of the two antenna elements are such that when both antennas contribute equally to the output, the effect on the running average of varying the amplitude contributions should be examined. A sharp null is seen at an elevation angle halfway between the mode of the one-hop and the two-hop beams respectively.

If now the relative amplitude of the contributions of these two antenna elements of the interferometer is changed, without changing the relative phases, it is clear that the depth of this null will vary. In the limiting case, where one antenna contributes full output and the other is effectively turned off, the null will disappear and a new, less directive polar pattern will be substituted for that shown in FIG. 2B. This change in antenna pattern shape will have the effect of alternating the relative amplitude of the voltages induced in the system by incoming modes. To the extent that the relative sensitivity to the two modes is changed by this process, useful reduction of the depth of the null in the output frequency spectrum will occur.

Figure 12:
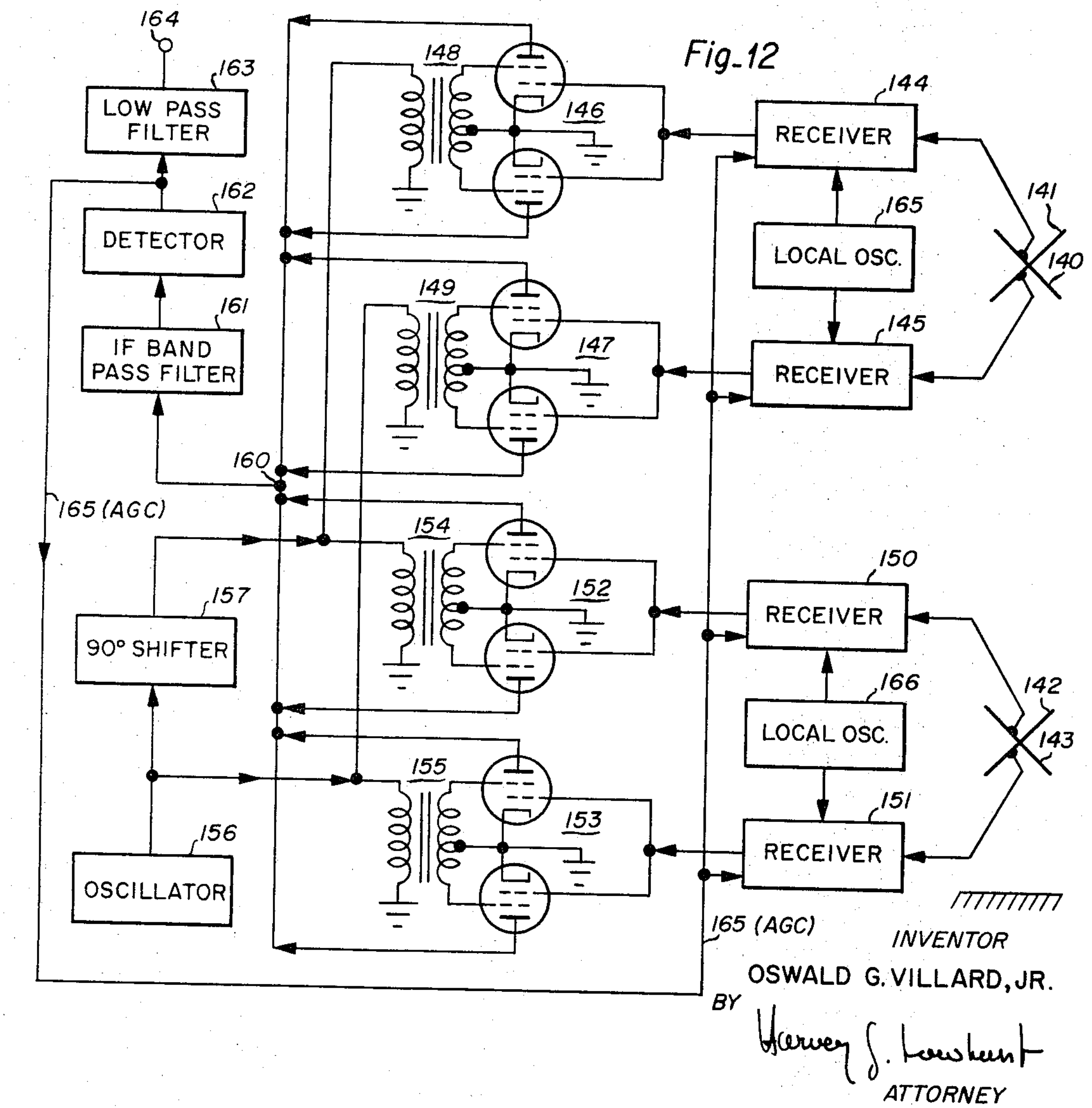
FIG. 12 is a schematic block diagram of still another embodiment of a mode-averaging receiver system of this invention utilizing polar pattern sweeping and rotation of the plane of polarization in combination.

Referring now to FIG. 12, there is shown another embodiment of the mode-average diversity combining reception system constructed in accordance with this invention which utilizes both a rotating plane of polarization and a vertically sweeping polar pattern for providing a running average of the modes. This embodiment has features in common with the embodiments shown in FIGS. 6 and 10.

A first pair of crossed dipoles 140 and 141 and a second pair of crossed dipoles 142 and 143 are spaced apart, either vertically or horizontally, and are arranged to lie in the plane of the great circle connecting the transmitter and the receiver systems for greatest efficiency. Crossed dipoles 140 and 141 are respectively connected to a pair of receivers 144 and 145 which are identical in all respects and which are either phase-locked to one another or which have a common local oscillator means 165 as shown. The intermediate frequency signal from receivers 144 and 145 is selected to have a first frequency, say 450 kilocycles per second. The intermediate frequency signals from receivers 144 and 145 are respectively applied to a pair of balanced modulators 146 and 147 which may be similar in construction to modulators 107 and 108 of FIG. 10. Modulators 146 and 147 are respectively provided with modulating input transformers 148 and 149 to which a suitable modulating signal may be applied.

Cross dipoles 142 and 143 are respectively connected to a pair of substantially identically receivers 150 and 151, phase-locked to one another or having a common local oscillator means 166 to provide an intermediate frequency signal of a second frequency, say 500 kilocycles per second. The intermediate frequency signals from receivers 150 and 151 are respectively applied to a pair of balanced modulators 152 and 153 which may be similar in all respects to modulators 146 and 147. Modulators 146 and 147 include respectively modulating input transformers 154 and 155 to which a suitable modulating signal may be applied.

A modulating signal source 156 provides a modulating signal which is applied directly to modulation input transformers 149 and 155 and, through a 90-degree phase shifter 157, to modulation input transformers 148 and 152. In this manner the modulating signal, which may have a frequency of 30 kilocycles per second, modulates the output signal from each pair of receivers in quadrature.

The modulated first intermediate frequency signal (450 kilocycles per second) from receivers 144 and 155 and the modulated second intermediate frequency signal (500 kilocycles per second) from receivers 150 and 151 are applied to a common summing network indicated by point 160. Summing network 160 is connected, through a band-pass filter 161 which may take the form of a coupling transformer, to a diode detector 162. A typical band-pass filter has a frequency pass-band extending from 150 to 850 kilocycles per second for faithful reproduction of the wave form of the combined signals at this point in the circuit. The output signal from detector 162 is passed through a conventional lowpass filter 163, having typically a pass-band extending from zero to 3 kilocycles per second, to a receiver output terminal 164. A portion of the detected signal may be utilized for an automatic gain control for all four receivers 144, 145, 150 and 151 through a feedback circuit indicated at 165.

The mode-averaging receiver system of FIG. 12 is a combination of the vertically swept antenna pattern of FIG. 6 and the rotating plane of antenna polarization of FIG. 10. More particularly antennas 140 and 141 form one element and antennas 142 and 143 form the other element of an antenna array which provides interferometer action. Neglecting for the amount the modulation of the intermediate frequency signals, the pair of receivers 144 and 145 provide intermediate frequency signals of 450 kilocycles per second and the pair of receivers 150 and 151 provide intermediate frequency signals of 500 kilocycles per second. Accordingly, at summing point 160 two intermediate frequencies have a beat frequency of 50 kilocycles per second and a running average of the amplitude is produced as explained in connection with the operation of FIG. 6.

Likewise the combination provided by each pair of crossed dipoles together with the quadrature modulation of the intermediate frequency signals has the effect of rotating the polarization of the associated crossed dipoles so that polarization averaging takes place as explained in connection with the operation of the mode-averaging receiver system of FIG. 10.

There has been described hereinabove a mode-averaging diversity combining reception system and various embodiments thereof which provide a running average of the received modes over a period of time which is shorter than the highest modulating frequency of the intelligence modulated upon the carrier. After averaging, the components are combined and the resulting average is utilized as the output signal. In this manner selective fading is substantially reduced or eliminated.

In one embodiment of this invention an interferometer type of antenna is either electrically synthesized, or mechanically created, to provide vertical polar pattern sweeping of the antenna pattern to average the amplitudes of the incoming modes. In another embodiment of this invention mode averaging is accomplished by an electrically synthesized rotation of the antenna polarization to average the individual components over a complete rotation of the plane of polarization.

In still another embodiment of this invention both incoming signals are permitted to be averaged in amplitude, one at the time, in a period of time which is short with the highest modulating frequency of the transmitted intelligence, and thereafter the components are combined. And finally, an embodiment has been presented in which averaging is accomplished by simultantously and effectively sweeping the vertical polar antenna pattern and rotating the antenna plane of polarization.

What is claimed is:

1. The method of substantially eliminating selective fading, due to the plural mode reception of a modulated carrier wave from a distant transmitter, in a radio receiver system which defines an effective directional receiver antenna pattern having alternating nulls and lobes, comprising the steps of:

cyclically and continuously sweeping the null of the receiver antenna pattern vertically in the great circle plane containing the receiver system and the distant transmitter at a sweeping rate which is higher than the highest frequency modulated upon the carrier wave; and demodulating the signal received by the receiver antenna.

2. The method of substantially eliminating selective fading, due to the plural mode reception of a modulated carrier wave from a distant receiver, in a radio receiver system which includes a pair of spaced apart antennas forming an effective directional polar antenna pattern looking at the transmitter and having alternating nulls and lobes, and a pair of separate receiver channels with a common output circuit, comprising the steps of:

electrically synthesizing the angular sweeping of the null of the polar receiving antenna pattern through the great circle plane containing the receiver system and the distant transmitter at a rate which is higher than the highest frequency modulated upon the carrier wave; and demodulating the signal received by the receiver antenna.

3. The method of minimizing selective fading, due to the plural mode reception of a modulated carrier wave, in a radio receiver system having a pair of crossed polarization sensitive antennas for developing separate signals, comprising the steps of:

converting said developed signals separately to a lower frequency to develop intermediate frequency signals;

amplitude modulating said separate intermediate frequency signals in quadrature with a common modulating signal having a frequency which is greater than the frequency of the highest audio signal modulated upon said carrier wave;

combining said separate modulated intermediate frequency signals to derive a resultant signal; and demodulating said resultant signal to derive the audio signal which corresponds to the modulation on the carrier wave.

4. The method of minimizing selective fading, due to the plural mode reception of a modulated carrier wave from a distant transmitter, in a radio receiver system having a first and a second pair of crossed polarization sensitive antenna elements spaced apart to provide an effective directional antenna pattern providing alternating nulls and lobes, and a common output detector circuit, said method comprising the steps of:

rotating the plane of polarization of the crossed antenna elements continuously and cyclically, in synchronism, at a rate which is higher than the highest audio signal modulated upon the carrier wave; and simultaneously sweeping the null of the antenna pattern cyclically and continuously through the great circle plane, containing the receiver system and the distant transmitter, at a rate which is higher than the highest audio signal modulated upon the carrier wave.

5. The method of minimizing selective fading, due to the plural mode reception of a modulated carrier wave from a distant transmitter, in a radio receiver system having a first and a second pair of crossed dipole antenna elements spaced apart to form a directional polar pattern and to develop separate received signals, said method comprising the steps of:

converting the received signals from said first pair of antenna elements to a first lower frequency to develop a pair of first intermediate frequency signals;

converting the received signals from said second pair of antenna elements to a second lower frequency, different from said first lower frequency, to develop a pair of second intermediate frequency signals;

modulating said first and said second pair of intermediate frequency signals in quadrature such that one intermediate frequency signal of each intermediate frequency signal pair is modulated in phase relative to one another and in quadrature phase with the other intermediate frequency signal;

combining said separate modulated intermediate frequency signals to derive a resultant signal; and demodulating said resultant signal to derive the audio signal modulated on the carrier wave.

6. A receiver system for minimizing selective fading due to the plural mode reception of an amplitude modulated carrier wave from a distant transmitter, comprising:

at least two signal collectors which are shaped and arranged to respond differently to a selected characteristic of the received plural modes;

a receiver means, including at least two receivers and a common detector means, coupled to said signal collectors; and amplitude-averaging means included in said receiver means to cyclically and continuously change the effective amplitude response of said receiver means to the signals from said signal collectors at a rate which is greater than the highest frequency modulated upon the carrier wave.

7. A receiver system for minimizing selective fading due to the plural mode reception of an amplitude modulated carrier wave from a distant transmitter, comprising:

a pair of signal collectors spaced apart to form a directive polar radiation pattern lying in the plane of the great circle containing the transmitter and to thereby differently respond to the plural modes in accordance with the directional characteristic of the plural modes;

dual-channel receiver means, including a common output detector means, coupled to said signal collectors; each of said signal collectors being connected to an associated one of said receiver channels in said dual-channel receiver means, and each of said channels of said receiver means being tuned to a different frequency; and means for cyclically and continuously varying the effective directive polar radiation pattern of said signal collectors in the great circle plane at a rate which is higher than the highest frequency modulated upon the carrier wave.

8. A receiver system for minimizng selective fading due to the plural mode reception of an amplitude modulated carrier wave from a distant transmitter, comprising:

a pair of polarization sensitive signal collectors arranged on a common axis in quadrature relation to differently respond to the polarization of the received plural modes;

dual-channel receiver means, including a common detector means, coupled to said signal collectors; each of said signal collectors being connected to an associated one of said receiver channels in said dual-channel receiver means, each of said channels being tuned to a different frequency, and the outputs of said two receiver channels being combined and supplied to said detection means; and means for cyclically and continuously rotating the effective plane of polarization at a rate which is higher than the highest frequency modulated upon the carrier wave.

9. An amplitude-averaging receiver system for the plural mode reception of a modulated carrier wave from a distant transmitter comprising:

a pair of spaced apart antenna elements arranged to have at least a portion of their antenna lobes lying in the great circle plane containing the distant transmitter;

phase shift means coupled to one of said antenna elements which cyclically and continuously changes the phase of the signal collected by the antenna element at a predetermined rate; and common receiver means coupled to the other of said antenna elements and said phase shift means.

10. An amplitude averaging receiver system for the plural mode reception of a modulated carrier wave from a distant transmitter, comprising:

a pair of spaced apart antenna elements arranged to have at least a portion of their receiving lobes lying in the great circle plane containing the distant transmitter;

phase shift means responsive to the signal collected by one of said antenna elements which continuously and cyclically changes the phase of the collected signal through a predetermined angle at a frequency which is higher than the frequency of the highest audio signal modulated on the carrier wave; and common receiver means responsive to the signal collected by the other of said antenna elements and the phase shifted signal which demodulates said two last mentioned signals to derive the audio signal of said modulated carrier wave.

11. An amplitude-averaging receiver system for receiving an amplitude modulated carrier wave from a distant transmitter comprising:

a pair of polarization sensitive antennas arranged in space quadrature relation;

a pair of substantially identically receiver means in phase-locked relation coupled to said pair of antennas for converting the signals collected by said pair of antennas into a pair of intermediate frequency signals of the same frequency;

a pair of modulator means coupled to said pair of receiver means for amplitude modulating said pair of intermediate frequency signals in phase quadrature with respect to one another; and common detector means for extracting the average of the vector sum of the phase quadrature modulated intermediate frequency signals.

12. An amplitude averaging receiver system for receiving an amplitude modulated carrier wave from a distant transmitter, comprising:

a pair of polarization sensitive antennas arranged about a common axis in space quadrature relation;

a pair of substantially identically receiver means, in phase-locked relation, coupled to said pair of antennas for converting the signals collected by said pair of antennas into a pair of intermediate frequency signals of the same frequency;

a pair of modulator means coupled to said pair of receiver means for amplitude modulating said pair of intermediate frequency signals in phase quadrature with respect to one another with a modulating signal having a frequency at least equal the frequency of the highest frequency signal modulated on said carrier wave; and common detector means for extracting the average of the vector sum of the quadrature modulated intermediate frequency signals.

13. An amplitude averaging receiver system for the plural reception of an amplitude modulated carrier wave from a distant transmitter comprising:

a pair of spaced apart antennas arranged to form a directive polar pattern lying in a great circle plane containing the distant transmitter;

a pair of substantially identical receiver means in phase-locked relation coupled to said pair of antennas for separately converting the collected antenna signals to a pair of intermediate frequency signals of the same frequency;

a pair of modulator means, responsive to a modulating signal, coupled to said pair of receivers means and arranged for amplitude modulating said pair of intermediate frequency signals in 180 degree phase opposition;

a source of modulating signals coupled to said pair of modulator means, said modulating signal having a frequency equal to at least twice the frequency of the highest signal modulated upon said carrier wave; and common detector means for the pair of modulated intermediate frequency signals.

14. An amplitude-averaging receiver system for the plural mode reception of an amplitude modulated carrier wave from a distant transmitter comprising:

a first pair of polarization sensitive antennas arranged about a common axis in space quadrature relation;

a second pair of polarization sensitive antennas arranged about another common axis in space quadrature relation and spaced apart from said first pair of antennas to form a directive polar pattern therewith lying in the great circle plane containing said distant transmitter;

means to separately reduce the signals collected by said first pair of antennas to a pair of intermediate frequency signals having a first common frequency;

means to separately reduce the signals collected by said second pair of antennas to a pair of intermediate frequency signals having a common second frequency different from said first frequency;

means for amplitude modulating said first pair of intermediate frequency signals in quadrature with respect to one another and said second pair of intermediate frequency signals in quadrature with respect to one another at a modulating frequency which is higher than the highest signal modulated upon said carrier wave; and common detector means for the quadrature modulated first and second pair of intermediate frequency signals.

15. An amplitude-averaging receiver system for the plural mode reception of an amplitude modulated carrier wave from a distant transmitter comprising:

a first pair of polarization sensitive antennas arranged about a common axis in space quadrature relation;

a second pair of polarization sensitive antennas arranged about another common axis in space quadrature relation and spaced apart from said first pair of antennas to form together therewith a directive polar pattern lying in the great circle plane containing said distant transmitter;

a first pair of substantially identical receiver means in phase-locked relation coupled to said first pair of antennas to separately reduce the antenna collected signals to a pair of intermediate frequency signals having a common first frequency;

a second pair of substantially identical receiver means in phase-locked relation coupled to said second pair of antennas to separately reduce the antenna collected signals to a pair of intermediate frequency signals having a common second frequency different from said first frequency;

a first pair of modulation means coupled to said first pair of receiver means and arranged for amplitude modulating said first pair of intermediate frequency signals in quadrature relation at a modulating frequency which is higher than the highest frequency signal modulated upon said carrier wave;

a second pair of modulating means coupled to said second pair of receiver means and arranged for amplitude modulating said second pair of intermediate frequency signals in quadrature relation at said modulating frequency; and common detector means for the quadrature modulated first and second pair of intermediate frequency signals.

16. The method of minimizing selective fading, due to the plural mode reception of a modulated carrier wave from a distant transmitter, in a radio receiver system which comprises the steps of:

spacing a pair of receiving antenna elements on the great circle passing through the distant transmitter;

converting the signal collected by one receiving antenna element to a first lower frequency to derive a first intermediate frequency signal;

converting the signal collected by the other receiving antenna element to a second lower frequency, different from said first lower frequency, to derive a second intermediate frequency signal;

adding said first and said second intermediate frequency signals to derive a resultant signal; and demodulating said resulting signal to derive the audio signal modulated upon said carrier wave.

17. A method in accordance with claim 16 which includes the further step of separately amplifying the signals collected by each of the receiving antenna elements the same amount and independent of the amplitude of individual collected signals.

References Cited

UNITED STATES PATENTS

| | | | |
|---|---|---|---|
| 1,915,782 | 6/1933 | Hammond | 343—100.3 |
| 1,915,784 | 6/1933 | Hammond | 343—100 |
| 2,042,831 | 6/1936 | Crosby | 343—117 |
| 2,273,161 | 2/1942 | Usselman | 343—100.3 |
| 2,413,543 | 12/1946 | Carlson | 325—305 |
| 2,444,425 | 7/1948 | Busignies | 343—100.6 |
| 2,448,017 | 8/1948 | Busignies et al. | 343—115 |
| 2,543,256 | 2/1951 | Peterson | 325—328 |
| 2,610,292 | 9/1952 | Bond et al. | 325—305 |
| 2,613,349 | 10/1952 | Kandoian | 343—100 |
| 2,966,583 | 12/1960 | Ross | 343—100 |
| 3,069,630 | 12/1962 | Adams et al. | 343—117 |
| 3,129,330 | 4/1964 | Seling. | |
| 3,140,490 | 7/1964 | Sichak et al. | 343—100 |

OTHER REFERENCES

Seely: Radio Electronics, TK 6550 S33, C. 2, pages 362–364; section 13–8.

RODNEY D. BENNETT, *Primary Examiner.*

CHESTER L. JUSTUS, *Examiner.*

C. E. WANDS, *Assistant Examiner.*